US012681868B2

(12) United States Patent
Salamat et al.

(10) Patent No.: US 12,681,868 B2
(45) Date of Patent: Jul. 14, 2026

(54) SYSTEMS AND METHODS FOR ADAPTIVE CACHE CONFIGURATION

(71) Applicant: Samsung Electronics Co., Ltd.,
Suwon-si (KR)

(72) Inventors: Sahand Salamat, San Diego, CA (US);
Zongwang Li, Dublin, CA (US);
Rekha Pitchumani, Oak Hill, VA (US)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 0 days.

(21) Appl. No.: 18/203,909

(22) Filed: May 31, 2023

(65) Prior Publication Data

US 2024/0303204 A1     Sep. 12, 2024

Related U.S. Application Data

(60) Provisional application No. 63/451,474, filed on Mar.
10, 2023.

(51) Int. Cl.
*G06F 12/128*     (2016.01)
*G06F 12/0864*     (2016.01)

(52) U.S. Cl.
CPC ........ *G06F 12/128* (2013.01); *G06F 12/0864*
(2013.01); *G06F 2212/1021* (2013.01); *G06F*
*2212/6012* (2013.01)

(58) Field of Classification Search
None
See application file for complete search history.

(56) References Cited

U.S. PATENT DOCUMENTS

| | | | |
|---|---|---|---|
| 8,151,077 B1 | 4/2012 | Bauer et al. | |
| 10,223,271 B2 | 3/2019 | Barczak et al. | |
| 10,599,573 B2 | 3/2020 | Sasanka | |
| 11,036,643 B1 * | 6/2021 | Asher ................. | G06F 12/0811 |
| 11,200,166 B2 | 12/2021 | Wallach | |
| 2015/0261438 A1 * | 9/2015 | Nagaraj .............. | G06F 12/0868 |
| | | | 711/113 |
| 2017/0052889 A1 | 2/2017 | Traeger | |
| 2018/0060238 A1 * | 3/2018 | Esser .................. | G06F 12/0848 |
| 2020/0257631 A1 * | 8/2020 | Chamarty .............. | G06F 9/544 |
| 2020/0341901 A1 * | 10/2020 | Sandberg ................ | H04L 9/003 |
| 2021/0357328 A1 * | 11/2021 | Abed .................. | G06F 12/0811 |

(Continued)

OTHER PUBLICATIONS

EPO Extended European Search Report dated May 22, 2024, issued
in European Patent Application No. 23211406.6 (7 pages).

*Primary Examiner* — Jared I Rutz
*Assistant Examiner* — Alexander J Yoon
(74) *Attorney, Agent, or Firm* — Womble Bond Dickinson
(US) LLP

(57) ABSTRACT

Systems and methods for a storage system are disclosed. The
storage system includes a first storage medium, a processor
configured to communicate with the first storage medium,
and a memory coupled to the processor. The memory stores
instructions that, when executed by the processor, cause the
processor to: receive a request for accessing data; search the
first storage medium based on the request; receive a com-
mand from a computing device, the command including a
configuration parameter; and based on the command,
modify architecture of the first storage medium from a first
architecture to a second architecture corresponding to the
configuration parameter.

20 Claims, 6 Drawing Sheets

(56) References Cited

U.S. PATENT DOCUMENTS

| 2021/0373951 | A1 | 12/2021 | Malladi et al. |
| 2022/0197814 | A1 | 6/2022 | Yudanov |
| 2022/0222180 | A1* | 7/2022 | Roberts ............... G06F 12/0864 |

\* cited by examiner

SYSTEMS AND METHODS FOR ADAPTIVE CACHE CONFIGURATION

CROSS-REFERENCE TO RELATED APPLICATION(S)

The present application claims priority to and the benefit of U.S. Provisional Application No. 63/451,474, filed Mar. 10, 2023, entitled "ADAPTIVE CACHE ARCHITECTURE WITH DYNAMIC ADJUSTMENT OF ARCHITECTURE AND REPLACEMENT POLICY FOR COMPUTATIONAL CXL SSD," the entire content of which is incorporated herein by reference.

FIELD

One or more aspects of one or more embodiments according to the present disclosure relate to systems and methods for data storage, and more particularly to systems and methods for adaptive cache configuration.

BACKGROUND

With advancements in general purpose processors and application-specific accelerators, storage devices are often a bottleneck of computer systems. Adding a layer of cache to storage devices may help reduce overall data access time (e.g., in the event of a cache hit). It may therefore be desirable to increase the hit rate of the cache layer to improve the performance of storage devices.

The above information disclosed in this Background section is only for enhancement of understanding of the background of the present disclosure, and therefore, it may contain information that does not form prior art.

SUMMARY

One or more embodiments of the present disclosure describe a storage system that includes a first storage medium, a processor configured to communicate with the first storage medium, and a memory coupled to the processor. The memory stores instructions that, when executed by the processor, cause the processor to: receive a request for accessing data; search the first storage medium based on the request; receive a command from a computing device, the command including a configuration parameter; and based on the command, modify architecture of the first storage medium from a first architecture to a second architecture corresponding to the configuration parameter.

According to some embodiments, the first storage medium includes a cache memory.

According to some embodiments, the configuration parameter identifies at least one of a data placement characteristic or data replacement characteristic. The data placement characteristic may include a characteristic of at least one of a direct mapped cache, fully associative cache, or set associative cache. The data replacement characteristic may include a characteristic of at least one of a least recently used (LRU) algorithm or a least frequently used (LFU) algorithm.

According to some embodiments, the configuration parameter identifies at least one of a cache block size or cache line size.

According to some embodiments, the request is associated with a memory address, and the instructions further cause the processor to translate the memory address to an address for the first storage medium based on the second architecture of the first storage medium.

According to some embodiments, the instructions further cause the processor to remove data in the first storage medium based on the second architecture of the first storage medium.

According to some embodiments, the command from the computing device is based on a detected data access pattern.

According to some embodiments, the computing device is configured to identify the configuration parameter based on the detected data access pattern.

One or more embodiments of the present disclosure also describe a method comprising: receiving a request for accessing data; searching a first storage medium based on the request; receiving a command from a computing device, the command including a configuration parameter; and based on the command, modifying architecture of the first storage medium from a first architecture to a second architecture corresponding to the configuration parameter.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
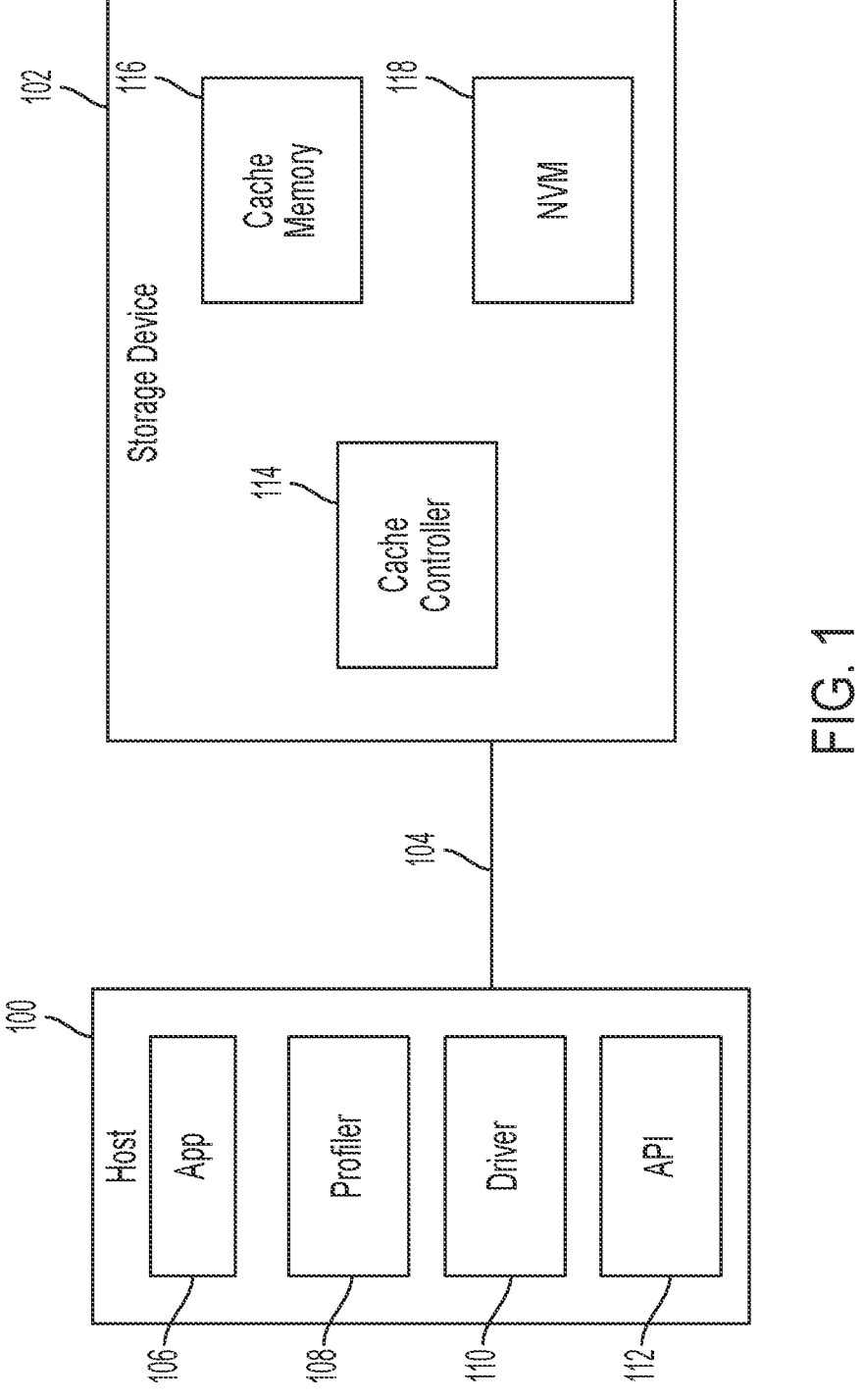
FIG. 1 depicts a block diagram of a computer system configured for adaptive cache configuration according to one or more embodiments.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Embodiments of the present disclosure are described below with reference to block diagrams and flow diagrams. Thus, it should be understood that each block of the block diagrams and flow diagrams may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flow diagrams. Accordingly, the block diagrams and flow diagrams support various combinations of embodiments for performing the specified instructions, operations, or steps.

In general terms, a storage device may include a cache memory that may help reduce overall access time of data requested by an application. For example, if data that is requested by the application is available in the cache memory (herein referred to as a "cache hit"), the data may be more quickly accessed and provided to the requesting application than when data is not available in the cache (herein referred to as a "cache miss"). When a cache miss occurs, the data is retrieved from a slower storage medium that may be in the storage device or in a separate device. It may therefore be desirable to increase the cache hit rate of the storage device.

Various cache architectures, configurations, and/or parameters (used interchangeably herein) may be used for increasing the hit rate of a cache device. For example, the size of the cache could be increased for storing more data, but power and area requirements may put a limit to the cache size. Other aspects of the cache could also be optimized for increasing the hit rate, such as, for example, employing an optimized cache placement and/or cache replacement (or eviction) scheme. Although the selected cache parameters may result in optimal performance for one application, it may not prove to be optimal for another type of application.

One or more embodiments of the present disclosure are directed to systems and methods for dynamically or adaptively (e.g., at runtime) configuring or reconfiguring (collectively referred to as configuring) a cache device based on the characteristics of an application (or type of application). For example, the configuring may include changing the architecture or placement policy of the cache to be a direct mapped cache, set associative cache (with a different number of ways), fully associative cache, and/or the like. The configuring may also include changing the replacement algorithm used by the cache to be one of a least recently used (LRU) algorithm, least frequently used (LFU) algorithm, segmented LRU (SLRU) algorithm, last in first out (LIFO) algorithm, first in last out (FILO) algorithm, time aware least recently used (TLRU) algorithm, and/or the like. The cache block or line size may also be adjusted (e.g., based on locality of cache memory accesses). Dynamically configuring the cache to cater to the properties of an application may help increase the hit rate and performance of the cache for different types of applications.

In some embodiments, the cache is included in a storage device. The storage device may include a cache controller that may be programmed by the host device over a data communications link such as, for example, a compute express link (CXL). In some embodiments, the cache device is dynamically configured by dynamically reprogramming the cache controller. The dynamic configuration may occur, for example, during running of the application.

In some embodiments, the host device monitors one or more characteristics of the application for determining whether the cache should be adjusted. The one or more characteristics may include, for example, performance of the application (e.g., cache hit or miss rates). In some embodiments, the host device transmits one or more signals for configuring the cache in response to determining that the performance of the application has degraded (e.g., the miss rate is greater than a threshold).

In some embodiments, the host device selects the configuration parameters for configuring the cache device based on one or more rules. The rules may relate, for example, to data access patterns detected for the application. One data access pattern may invoke one set of configuration parameters while another data access pattern may invoke a different set of configuration parameters. The configuration parameters may include, for example, a cache placement policy, cache replacement/eviction policy, cache block or line size, cache data access strategy, cache data and tag format, and/or the like.

In some embodiments, the cache controller generates a cache address for a requested physical address, based on the configured cache parameters. The cache controller may further determine whether an access request results in a cache hit or miss. The cache controller may further identify and evict entries from the cache according to the configured replacement policy.

FIG. 1 depicts a block diagram of a computer system configured for adaptive cache configuration according to one or more embodiments. The system may include a host computing device ("host") 100 coupled to a storage device 102 over one or more interface connections 104. In some embodiments, the interface connection 104 (e.g., the connector and the protocol thereof) includes various general-purpose interfaces such as, for example, Ethernet, Universal Serial Bus (USB), and/or the like. In some embodiments, the interface connections 104 (e.g., the connector and the protocol thereof) may include (or may conform to) a Compute Express Link (CXL), Cache Coherent Interconnect for Accelerators (CCIX), dual in-line memory module (DIMM) interface, Small Computer System Interface (SCSI), Non Volatile Memory Express (NVMe), Peripheral Component Interconnect Express (PCIe), remote direct memory access (RDMA) over Ethernet, Serial Advanced Technology Attachment (SATA), Fiber Channel, Serial Attached SCSI (SAS), NVMe over Fabric (NVMe-oF), iWARP protocol, InfiniBand protocol, 5G wireless protocol, Wi-Fi protocol, Bluetooth protocol, and/or the like.

In some embodiments, the storage device 102 includes a cache controller 114, cache memory 116 (e.g., first storage medium), and non-volatile memory (NVM) 118 (e.g., second storage medium). The cache controller 114 may be implemented using an in-storage or near storage processing circuit such as, for example, an application specific integrated circuit (ASIC), general purpose or special purpose central processing unit (CPU), digital signal processor (DSP), graphics processing unit (GPU), and/or a programmable logic device such as field programmable gate array (FPGA). In some embodiments, the cache controller 114 is programmable based on instructions from the host 100. For example, the cache controller 114 may be programmed with configuration parameters of the cache memory 116. The data placement and/or data replacement actions may differ depending on the configuration of the cache memory 116. The cache block or line size may also differ depending on the configuration.

In some embodiments, the cache controller 114 processes memory access requests from the host 100 based on the configuration of the cache memory 116, and identifies the request as a cache miss or hit. In the event of a cache hit, the requested data is provided by the cache memory 116. In the event of a cache miss, the requested data is provided by the NVM 118.

The cache memory 116 may include a DRAM, SRAM, and/or any other volatile computer readable storage medium, such as, for example, a random access memory (RAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), flash memory, register memory, and/or the like.

The cache memory 116 may store copies of data stored in the NVM 118 for faster access of the data. In this regard, the cache memory 116 may have a lower access latency than the NVM 118, allowing for improved performance of the storage device 102 in the event of a cache hit.

In the event of a cache miss (e.g., when data requests by the host 100 is not present in the cache memory 116), the data is retrieved from the NVM 118. The NVM 118 may include a NAND flash memory and/or other non-volatile computer readable storage medium including, for example, a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. The non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF)

cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

It should be appreciated that although the cache memory 116 is depicted in FIG. 1 as being in a same storage device as the NVM 118, the cache memory 116 and the NVM 118 may reside in separate storage devices. It should also be appreciated that the cache controller 114 may reside in a same storage device or in a storage device separate from the storage device 102 hosting the cache memory 116 and/or NVM 118.

In some embodiments, the host 100 is configured to execute an application 106 and a profiler module 108. For example, the application 106 and profile module 108 may be executed by a processor (not shown) based on computer program instructions stored in a memory (not shown) of the host 100. The application 106 may be any application configured to transmit requests (e.g., data access requests) to the storage device 102. For example, the application 106 may be a big data analysis application, e-commerce application, database application, machine learning application, and/or the like. Data requests such as, for example, load and store requests, may be generated during the running of the application 106. The data requests may be transmitted to the storage device 102 via a driver 110. In some embodiments, the data requests and responses are transmitted using CXL. The store device 102 may return the requested data to the application 106, which may in turn generate an output in response to the data. Performance of the application 106 may depend on how fast the data is retrieved by the storage device 102 and returned to the application. Data may be retrieved faster in the event of a cache hit.

In some embodiments, the profiler module 108 is configured to determine one or more characteristics of the application 106 and/or cache memory 116. A determined characteristic may be, for example, performance of the cache memory 116 during execution of the application 106. An example performance metric may include a cache hit rate, cache miss rate, data access average latency, data access tail latency, and/or the like. In some embodiments, the profiler module 108 compares the cache performance metric against a threshold value. The profiler module 108 may be configured to modify one or more aspects of the cache memory 116 based on the performance metric falling below the threshold value. The modification may be for improving the cache performance.

In some embodiments, the profiler module 108 is configured with a set of rules, such as rules based on maximum cache hit rate, maximum throughput, average data access latency, data access tail latency, and on the like, for selecting one or more cache configuration parameters based on data access patterns and/or application features. In some embodiments, the profiler module 108 includes a machine learning model that is trained to output one or more recommended configuration parameters based on input data. The input data may include, for example, data access samples, access patterns, optimization criteria, and/or application features.

In some embodiments, the one or more configuration parameters are transmitted to the cache controller 114 via an application programming interface (API) 112. For example, the profiler 108 may generate a command that includes the one or more configuration parameters using CXL or another protocol, and transmit the command with the configuration parameter(s) to the storage device 102 using the API 112. The cache controller 114 may receive the command and the configuration parameter(s), and program one or more parameters of the cache memory 116 based on the command. The programming of the one or more parameters may cause the cache controller 114 to switch architecture of the cache memory 116 from one cache architecture to another.

Figure 2:
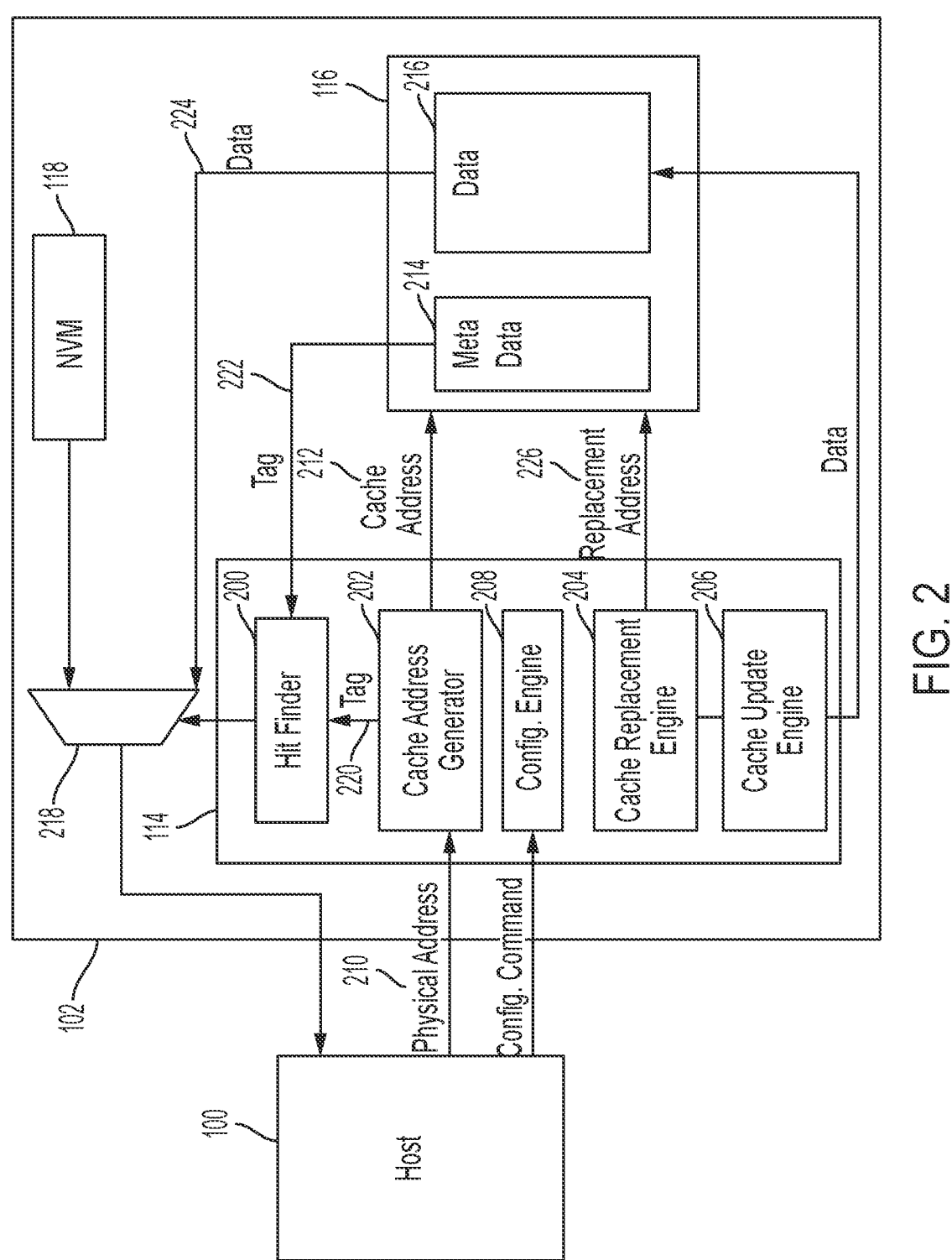
FIG. 2 depicts a block diagram of a cache controller and its interaction with various components of a storage device and a host for adaptively configuring a cache memory according to one or more embodiments.

FIG. 2 depicts a block diagram of the cache controller 114 and its interaction with various components of the storage device 102 and the host 100 for adaptively configuring the cache memory 116 according to one or more embodiments. In some embodiments, the cache controller 114 includes a hit finder 200, cache address generator 202, cache replacement engine 204, cache update engine 206, and cache configuration engine 208.

In some embodiments, the cache configuration engine 208 receives a command from the host 100. The command may be, for example, a CXL command that may be interpreted by a fabric management module (not shown). The command may include one or more cache configuration parameters. The host 100 may transmit the command over the API 112 during runtime of an application 106, for example, in response to a trigger condition.

The cache configuration engine 208 may program one or more aspects of the cache memory 116 based on the command. In some embodiments, the cache memory 116 is bypassed for data access during the programming of the cache memory. The contents of the cache memory 116 and/or other related data (e.g., cache replacement lists) may also be flushed or marked as invalid in response to switching the cache memory from one cache architecture to another.

In some embodiments, the configuration engine 208 may communicate with the cache address generator 202 and cache replacement engine 204 to configure one or more aspects of the cache memory 116. For example, the configuration engine 208 may configure the cache address generator 202 with a placement policy including, for example, a direct mapped cache, set associative cache, fully associative cache, and/or the like. The configuration engine 208 may further configure the cache address generator 202 with a cache block or cache line size. For example, the cache line size may be selected to be one of 32, 64, 128, 256, or 512 bytes, based on the locality of the cache accesses. For example, for data access that has high locality with most data residing in 4 KB blocks, a 4 KB cache line may be selected for providing better performance in terms of access time and throughput. The selected cache line size may affect the depth or shallowness of the cache, and provide different types of tradeoffs in terms of cache performance.

The configuration engine 208 may further configure the cache replacement engine 204 with a replacement algorithm including, for example, a least recently used (LRU) algorithm, least frequently used (LFU) algorithm, segmented LRU (SLRU) algorithm, last in first out (LIFO) algorithm, first in last out (FILO) algorithm, time aware least recently used (TLRU) algorithm, and/or the like.

In some embodiments, the cache address generator 202 receives a physical address 210 of a memory access request from the host 100, and generates a corresponding cache address 212. In some embodiments, the address provided by the host 100 is a logical address, and the physical address is provided by a component of the storage device 102 or the like. The cache address 212 that is generated for the memory request may depend on the configuration of the cache memory 116, such as, for example, whether the cache memory is a direct mapped cache, set associative cache, fully associative cache, and/or the like.

In some embodiments the generated cache address 212 includes at least a tag, an index, and an offset. The tag may include (e.g., may be) a first set of one or more bit positions. The index may include (e.g., may be) a second set of one or more bit positions. The offset may include (e.g., may be) a third set of one or more bit positions. The portion of the physical address that is used to generate the tag, index, and offset may depend on the configured cache architecture. In one or more embodiments, one or more most significant bits of the physical address is used as the tag, one or more least significant bits of the physical address is used as the offset, and the remaining bits are used as the index. Of course, embodiments of the present disclosure are not limited thereto, and different combinations of the bits in the physical address may be used for the tag, index, and/or offset.

In some embodiments, the hit finder 200 determines, based on a tag 220 generated for a memory request, whether the memory request results in a cache hit or miss. In this regard, the cache memory 116 uses the index portion of the generated cache address to identify a portion of the cache memory 116 to search. Depending on whether the cache is configured as a direct mapped cache, set associative cache, fully associative cache, and/or the like, the index may identify a specific cache line or multiple cache lines where data may be stored. In some embodiments, the tag(s) 222 that are stored in the metadata portion 214 for the identified cache line(s) are provided to the hit finder 200 for determining a cache hit or miss.

In some embodiments, the hit finder 200 receives the retrieved tag(s) 222 and compares the retrieved tag(s) with the tag 220 generated for the memory request. The hit finder 200 may signal a cache hit in response to a match. The hit finder 200 may signal a cache miss in response to not finding a match.

In some embodiments, the signal from the hit finder 200 is provided to a multiplexor 218 for outputting the requested data from the cache memory 116 or the NVM 118. For example, the multiplexor 218 may output the requested data from a data portion 216 of the cache memory 116 in response to a cache hit. The multiplexor 218 may output the requested data from the NVM 118 in response to a cache miss.

In some embodiments, in the event of a cache miss, the data retrieved from the NVM 118 is stored in the cache memory 116 (e.g., the data portion 216 of the cache memory), by the cache update engine 206, based on the physical address of the data. In the event that the portion of the cache where the data is to be stored is full, the cache replacement engine 204 may identify a replacement address 226 of a cache line or cache block that is to be replaced by the new data. In some embodiments, the replacement address depends on the configured replacement algorithm. For example, if the replacement algorithm is an LRU algorithm, the replacement address is for a least frequently used cache line. In this regard, data such as access frequency, access time, access address, access type, and/or the like, may be stored in the metadata portion 214 of the cache memory 116. The cache replacement engine 204 may access the metadata information in selecting the appropriate data to evict based on the configured cache replacement policy.

Figure 3:
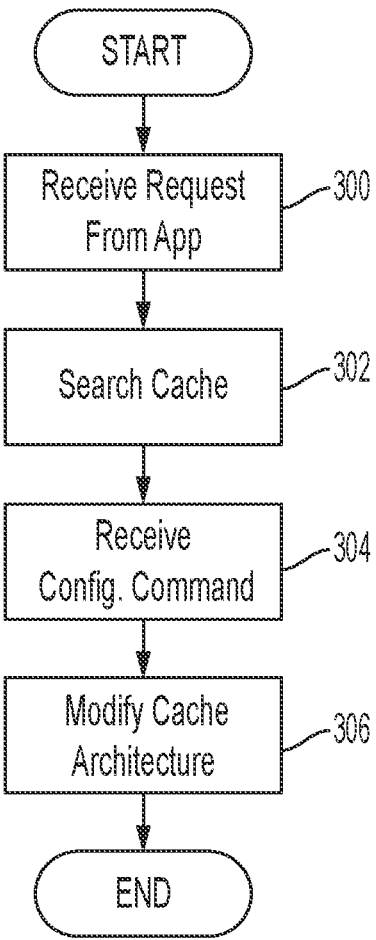
FIG. 3 depicts a flow diagram of a process for adaptively configuring a cache memory according to one or more embodiments.

FIG. 3 depicts a flow diagram of a process for adaptively configuring the cache memory 116 according to one or more embodiments. In some embodiments, the adaptive configuration occurs during runtime of an application 106, although embodiments are not limited thereto.

The process starts, and in act 300, the cache controller 114 receives a memory access request from an application 106 running on the host 100. The memory access request may include a memory load or store request. The memory access request may include, for example, a physical address of the memory that is to be accessed.

In act 302, the cache memory 116 is searched for determining a cache hit or miss. The requested data may be retrieved from the cache in the event of a cache hit. The requested data may be retrieved from the NVM 118 in the event of a cache miss.

In act 304, the cache controller 114 receives a cache configuration command from the host 100. The cache configuration command may be triggered, for example, by the profiler 108 in the host 100 based on, for example, a detected performance metric. The performance metric may include a detected cache hit rate or a detected cache miss rate. The cache configuration command may include one or more cache configuration parameters.

In act 306, the architecture of the cache memory 116 is modified from the first cache architecture to a second cache architecture based on the cache configuration command. In some embodiments, the switching of the cache architecture improves the performance (e.g., cache hit rate) of the cache memory 116.

Figure 4:
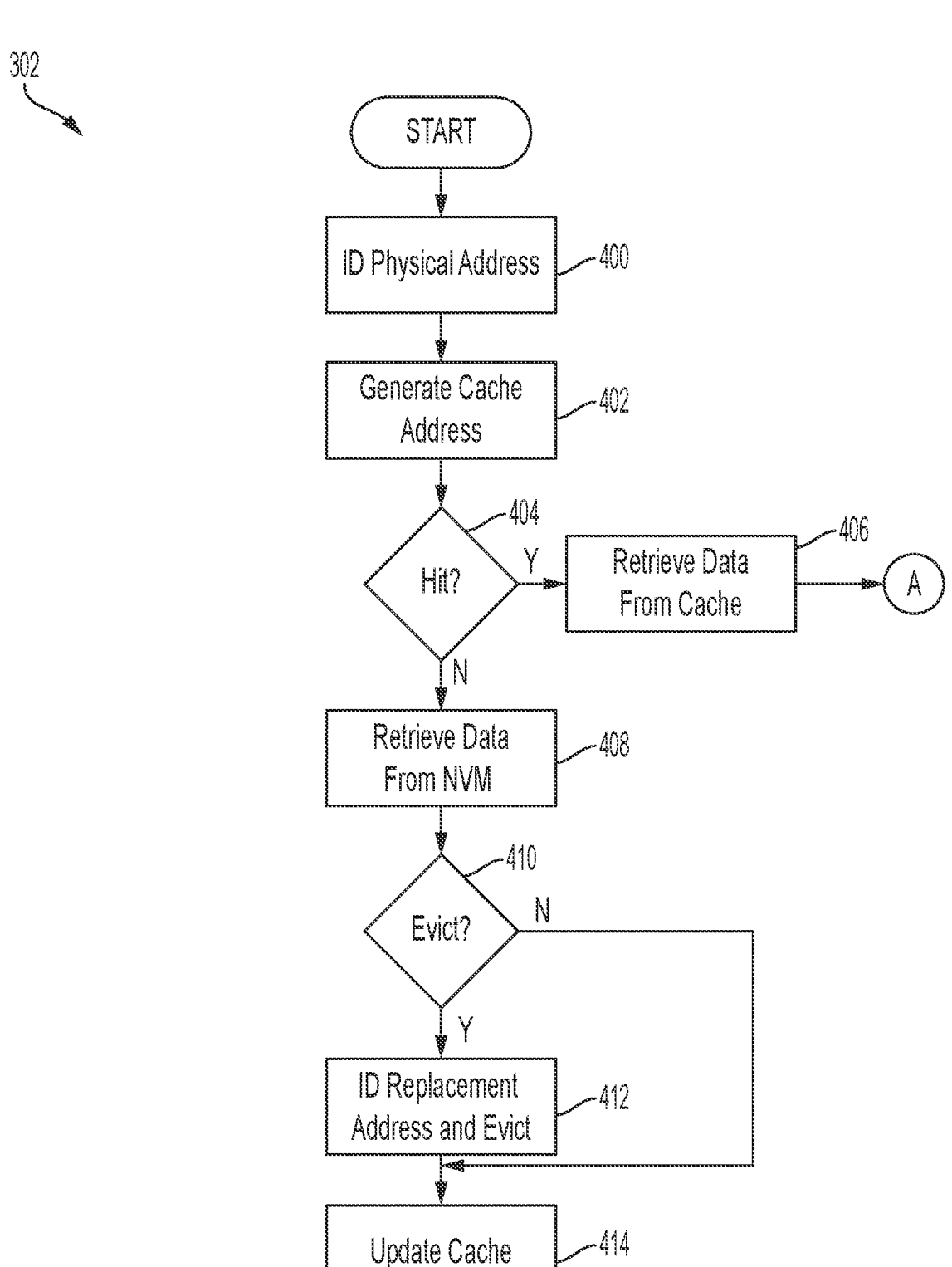
FIG. 4 depicts a flow diagram of the process for searching a cache memory in response to a memory access request according to one or more embodiments.

FIG. 4 depicts a flow diagram of the process for searching the cache memory 116, in act 302 of FIG. 3, in response to a memory access request according to one or more embodiments. The process starts, and in act 400, the cache address generator 202 identifies the physical address associated with the memory access request.

In act 402, the cache address generator 202 generates a cache address based on the physical address. The cache address may include a tag, index, and offset bits. The bits of the cache address that contribute to the tag, index, and offset bits may depend, for example, on the configured cache placement policy.

In act 404, a determination is made as to whether a cache hit occurs based on the generated cache address. A cache hit may occur when the tag in the generated cache address matches a tag stored in a portion of the cache memory 116 identified by the index of the generated cache address.

If a cache hit occurs, the requested data is retrieved from the cache memory 116 in act 406.

If a cache miss occurs, the data is retrieved from the NVM 118 in act 408, and an attempt is made to save the retrieved data in the cache memory 116. In this regard, a determination is made, in act 410, as to whether the portion of the cache where the data is to be stored, is full, requiring eviction of other data from the portion of the cache memory 116.

If the answer is NO, and there is space in the portion of the cache memory 116 (e.g., the portion identified by the cache index), the cache update engine 206 updates the cache memory with the retrieved data. In some embodiments, the cache update engine 206 stores the tag, access time, and/or other metadata in the metadata portion 214 of the cache memory for the cache line storing the data. In some embodiments, the cache update engine 206 increases an access frequency count for the cache line, and stores the access frequency count in the metadata portion 214.

Referring again to act 410, if the portion of the cache memory is full, the cache replacement engine 204 identifies, in act 412, a replacement address for evicting data associated with the replacement address. In some embodiments, the data that is to be evicted depends on the configured cache replacement algorithm. The retrieved new data may be stored in the replacement address in response to the previously stored data being evicted.

Figure 5:
FIG. 5 depicts a flow diagram of a process executed in association with switching of a cache architecture according to one or more embodiments.
Figure 5:
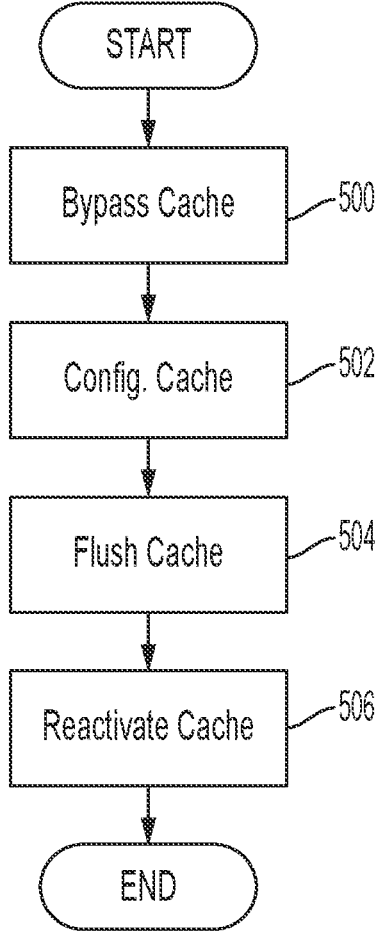

FIG. 5 depicts a flow diagram of a process executed in association with the switching of the cache architecture in act 306 of FIG. 3, according to one or more embodiments. The process starts, and in act 500, in response to receipt of a cache configuration command, the cache configuration engine 208 transmits a signal (e.g., to the cache address generator 202) for bypassing the cache memory 116 when responding to memory access requests.

In act 502, the cache configuration engine 208 proceeds to configure the cache memory 116 based on the received cache configuration command.

In act 504, the cache configuration engine 208 transmits a signal to flush or invalidate the entries currently stored in the cache memory 116. In some embodiments, other information may also be invalidated or flushed, such as, for example, LRU lists, and/or other data structures maintained according to a current cache replacement policy.

In act 506, the cache configuration engine 208 transmits a signal to reactivate the cache memory 116. In response to the signal to reactive, the cache memory 116 proceeds to store and evict data according to the newly configured cache configuration parameters.

Figure 6:
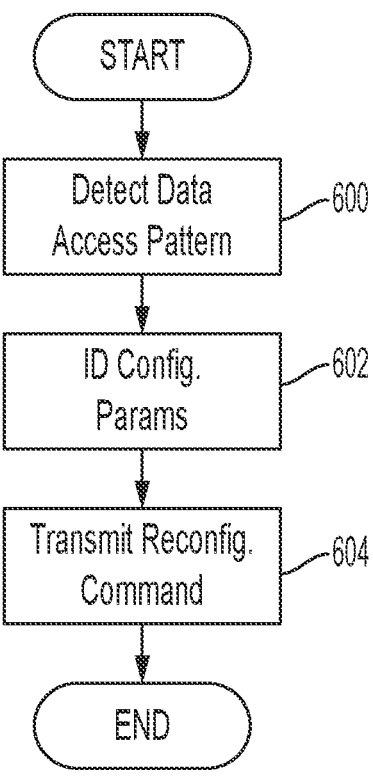
FIG. 6 depicts a flow diagram of a process executed by a host for selecting cache configuration parameters and triggering adaptive configuration of a cache memory according to one or more embodiments.

FIG. 6 depicts a flow diagram of a process executed by the host 100 (e.g., the profiler module 108) for selecting cache configuration parameters and triggering the adaptive configuration of the cache memory 116 according to one or more embodiments. The process starts, and in act 600, the profiler 108 detects one or more characteristics of the application 106 utilizing the cache memory 116. For example, the profiler 108 may detect data access patterns by the application 106 at runtime. The profiler 108 may also monitor performance of the cache memory 116 in fulfilling the data access requests. An example performance that may be monitored is a cache hit ratio, average data access latency, or tail latency.

In some embodiments, the profiler 108 triggers reconfiguration of the cache memory 116 in response to the cache performance being below a threshold value. In this regard, the profiler identifies, in act 602, one or more configuration parameters for reconfiguring the cache memory 116. In some embodiments, the configuration parameters are identified based on a set of rules. The rules may be generated, for example, by modeling the behavior of the cache memory 116 based on sample data (e.g., different access patterns). The profiler 108 may identify one or more optimal configuration parameters for the different access patterns including, for example, the locality of cache accesses. An example rule may be, for example, to select a configuration with maximum cache hit ratio, select a configuration with a minimum average data access latency, select a configuration with minimum data access tail latency, and/or the like. In some embodiments, optimal configuration parameters are stored as metadata for the application 106.

In some embodiments, the profiler module 108 includes a machine learning model that is trained to output one or more recommended configuration parameters based on input data. The input data may include, for example, access patterns and/or application features. The machine learning model may include one or more neural networks or sub-networks, and may be trained in an end-to-end fashion based on training data including data access patterns and labels identifying a desired output, such as, for example, desired cache configuration parameters. The training of the machine learning model may be via regression, decision trees, random forests, deep neural networks, and/or the like. If used, a deep neural network may include two or more layers, such as an input layer that receives the data access patterns and/or other extracted features of the application, and an output layer that outputs a set of recommended configuration features. One or more intermediate layers may also be included in the neural network. The layers of the neural network may represent different groups or sets of artificial neurons which may represent different functions performed on the input features to determine the optimal cache configuration parameters. The artificial neurons may apply different weights in the functions applied to the input features to attempt to output the optimal cache configuration parameters.

In act 604, the profiler module 108 transmits the identified cache configuration parameters for programming the cache controller 114. In some embodiments, the cache configuration parameters are transmitted via the API 112 using a CXL command. The architecture of the cache memory 116 may change based on the transmitted command. The change of the architecture may increate the hit rate and performance of the cache.

One or more embodiments of the present disclosure may be implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for adaptive cache configuration have been specifically described and illustrated herein, many modifications and variations will be apparent to those skilled in the art. Accordingly, it is to be understood that systems and methods for adaptive cache configuration constructed according to principles of this disclosure may be embodied other than as specifically described herein. The disclosure is also defined in the following claims, and equivalents thereof.

The systems and methods described herein may contain one or more combination of features set forth in the below statements.

Statement 1. A storage system comprising: a first storage medium; a processor configured to communicate with the first storage medium; and a memory coupled to the processor, the memory storing instructions that, when executed by the processor, cause the processor to: receive a request for accessing data; search the first storage medium based on the request; receive a command from a computing device, the command including a configuration parameter; and based on the command, modify architecture of the first storage medium from a first architecture to a second architecture corresponding to the configuration parameter.

Statement 2. The storage system of Statement 1, wherein the first storage medium includes a cache memory.

Statement 3. The storage system of Statement 2, wherein the configuration parameter identifies at least one of a data placement characteristic or data replacement characteristic.

Statement 4. The storage system of Statement 3, wherein the data placement characteristic includes a characteristic of at least one of a direct mapped cache, fully associative cache, or set associative cache.

Statement 5. The storage system of Statement 3, wherein the data replacement characteristic includes a characteristic of at least one of a least recently used (LRU) algorithm or a least frequently used (LFU) algorithm.

Statement 6. The storage system of Statement 2, wherein the configuration parameter identifies at least one of a cache block size or cache line size.

Statement 7. The storage system of Statement 1, wherein the request is associated with a memory address, and the instructions further cause the processor to translate the memory address to an address for the first storage medium based on the second architecture of the first storage medium.

Statement 8. The storage system of Statement 1, wherein the instructions further cause the processor to remove data in the first storage medium based on the second architecture of the first storage medium.

Statement 9. The storage system of Statement 1, wherein the command from the computing device is based on a detected data access pattern.

Statement 10. The storage system of Statement 9, wherein the computing device is configured to identify the configuration parameter based on the detected data access pattern.

Statement 11. A method comprising: receiving a request for accessing data; searching a first storage medium based on the request; receiving a command from a computing device, the command including a configuration parameter; and based on the command, modifying architecture of the first storage medium from a first architecture to a second architecture corresponding to the configuration parameter.

Statement 12. The method of Statement 11, wherein the first storage medium includes a cache memory.

Statement 13. The method of Statement 12, wherein the configuration parameter identifies at least one of a data placement characteristic or data replacement characteristic.

Statement 14. The method of Statement 13, wherein the data placement characteristic includes a characteristic of at least one of a direct mapped cache, fully associative cache, or set associative cache.

Statement 15. The method of Statement 13, wherein the data replacement characteristic includes a characteristic of at least one of a least recently used (LRU) algorithm or a least frequently used (LFU) algorithm.

Statement 16. The method of Statement 12, wherein the configuration parameter identifies at least one of a cache block size or cache line size.

Statement 17. The method of Statement 11, wherein the request is associated with a memory address, and the method further comprises: translating the memory address to an address for the first storage medium based on the second architecture of the first storage medium.

Statement 18. The method of Statement 11 further comprising: removing data in the first storage medium based on the second architecture of the first storage medium.

Statement 19. The method of Statement 11, wherein the command from the computing device is based on a detected data access pattern.

Statement 20. The method of Statement 19, wherein the computing device identifies the configuration parameter based on the detected data access pattern.

What is claimed is:

1. A storage system comprising:
a first storage medium;
a processor configured to communicate with the first storage medium; and
a memory coupled to the processor, the memory storing instructions that, when executed by the processor, cause the processor to:
  receive, from an application executed by a computing device, a request for accessing data, wherein the request is associated with a physical address;
  generate a cache address based on the physical address and further based on a first architecture of the first storage medium;
  based on generating the cache address:
    search the first storage medium for the cache address;
    based on a result of the search, store at least a portion of the cache address in the first storage medium in association with the data;
  based on the search of the first storage medium, receive a command from the computing device, the command including a configuration parameter, wherein the computing device is configured to select the configuration parameter based on a runtime characteristic of the application; and
  based on the command, modify architecture of the first storage medium from the first architecture to a second architecture corresponding to the configuration parameter.

2. The storage system of claim 1, wherein the first storage medium includes a cache memory.

3. The storage system of claim 2, wherein the configuration parameter identifies at least one of a data placement characteristic or data replacement characteristic.

4. The storage system of claim 3, wherein the data placement characteristic includes a characteristic of at least one of a direct mapped cache, fully associative cache, or set associative cache.

5. The storage system of claim 3, wherein the data replacement characteristic includes a characteristic of at least one of a least recently used (LRU) algorithm or a least frequently used (LFU) algorithm.

6. The storage system of claim 2, wherein the configuration parameter identifies at least one of a cache block size or cache line size.

7. The storage system of claim 1, wherein the request is associated with a memory address, and the instructions further cause the processor to translate the memory address to an address for the first storage medium based on the second architecture of the first storage medium.

8. The storage system of claim 1, wherein the instructions further cause the processor to remove the data in the first storage medium based on the second architecture of the first storage medium.

9. The storage system of claim 1, wherein the command from the computing device is based on a detected data access pattern.

10. The storage system of claim 9, wherein the computing device is configured to identify the configuration parameter based on the detected data access pattern.

11. A method comprising:
receiving from an application executed by a computing device, a request for accessing data, wherein the request is associated with a physical address;
generating a cache address based on the physical address and further based on a first architecture of a first storage medium;
based on generating the cache address:
  searching the first storage medium for the cache address;
  based on a result of the searching, storing at least a portion of the cache address in the first storage medium in association with the data;
based on searching the first storage medium, receiving a command from the computing device, the command including a configuration parameter, wherein the computing device is configured to select the configuration parameter based on a runtime characteristic of the application including a characteristic associated with the search; and
based on the command, modifying architecture of the first storage medium from the first architecture to a second architecture corresponding to the configuration parameter.

12. The method of claim 11, wherein the first storage medium includes a cache memory.

13. The method of claim 12, wherein the configuration parameter identifies at least one of a data placement characteristic or data replacement characteristic.

14. The method of claim 13, wherein the data placement characteristic includes a characteristic of at least one of a direct mapped cache, fully associative cache, or set associative cache.

15. The method of claim 13, wherein the data replacement characteristic includes a characteristic of at least one of a least recently used (LRU) algorithm or a least frequently used (LFU) algorithm.

16. The method of claim 12, wherein the configuration parameter identifies at least one of a cache block size or cache line size.

17. The method of claim 11, wherein the request is associated with a memory address, and the method further comprises:

translating the memory address to an address for the first storage medium based on the second architecture of the first storage medium.

18. The method of claim 11 further comprising:

removing the data in the first storage medium based on the second architecture of the first storage medium.

19. The method of claim 11, wherein the command from the computing device is based on a detected data access pattern.

20. The method of claim 19, wherein the computing device identifies the configuration parameter based on the detected data access pattern.

\* \* \* \* \*